(12) United States Patent
Oh et al.

(10) Patent No.: US 8,420,265 B2
(45) Date of Patent: Apr. 16, 2013

(54) ELECTROLYTE FOR RECHARGEABLE LITHIUM BATTERY AND RECHARGEABLE LITHIUM BATTERY INCLUDING THE SAME

(75) Inventors: Mi-Hyeun Oh, Suwon-si (KR); Jin-Sung Kim, Suwon-si (KR); Na-Rae Park, Suwon-si (KR); Su-Hee Han, Suwon-si (KR); Jin-Hyunk Lim, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 664 days.

(21) Appl. No.: 12/591,937

(22) Filed: Dec. 4, 2009

(65) Prior Publication Data

US 2010/0248039 A1    Sep. 30, 2010

(30) Foreign Application Priority Data

Mar. 31, 2009  (KR) .................. 10-2009-0027645

(51) Int. Cl.
*H01M 6/18* (2006.01)

(52) U.S. Cl.
USPC .......... 429/307; 429/306; 429/326; 429/330; 429/332; 429/338; 429/342; 429/199; 429/200; 252/62.2

(58) Field of Classification Search ........... 429/307, 429/306, 326, 330, 332, 338, 342, 199, 200; 252/62.2
See application file for complete search history.

(56) References Cited

U.S. PATENT DOCUMENTS

| 6,919,141 B2 | 7/2005 | Gan et al. |
| 2002/0012849 A1 | 1/2002 | Miura et al. |
| 2004/0091772 A1 | 5/2004 | Ravdel et al. |
| 2005/0174092 A1 | 8/2005 | Dougherty et al. |
| 2006/0024587 A1 | 2/2006 | Tamura et al. |
| 2007/0048623 A1 | 3/2007 | Park et al. |
| 2007/0202417 A1 | 8/2007 | Horikawa et al. |
| 2008/0118428 A1 | 5/2008 | Awano et al. |

FOREIGN PATENT DOCUMENTS

| JP | 07-153487 | | 6/1995 |
| JP | 08-321313 | | 3/1996 |
| JP | 2000-331710 | | 11/2000 |
| JP | 2007-123097 | * | 5/2007 |
| KR | 10-2007-0023451 | | 2/2007 |
| KR | 2008-061692 | * | 7/2008 |
| KR | 10-0873632 B1 | | 12/2008 |

OTHER PUBLICATIONS

Korean Office Action issued by Korean Patent Office on Nov. 16, 2010 corresponding to Korean Patent Application No. 10-2009-0027645 and Request for Entry of the Accompanying Office Action attached herewith.

* cited by examiner

*Primary Examiner* — Laura Weiner
(74) *Attorney, Agent, or Firm* — Robert E. Bushnell, Esq.

(57) ABSTRACT

Disclosed is an electrolyte for a rechargeable lithium battery that includes a lithium salt, a phosphine compound having at least one trialkylsilyl group and organic solvent, and a rechargeable lithium battery including the electrolyte. The phosphine compound may be tris(trialkylsilyl)phosphine wherein the alkyl groups are the same or different and are each independently selected from C1 to C6 alkyl.

18 Claims, 1 Drawing Sheet

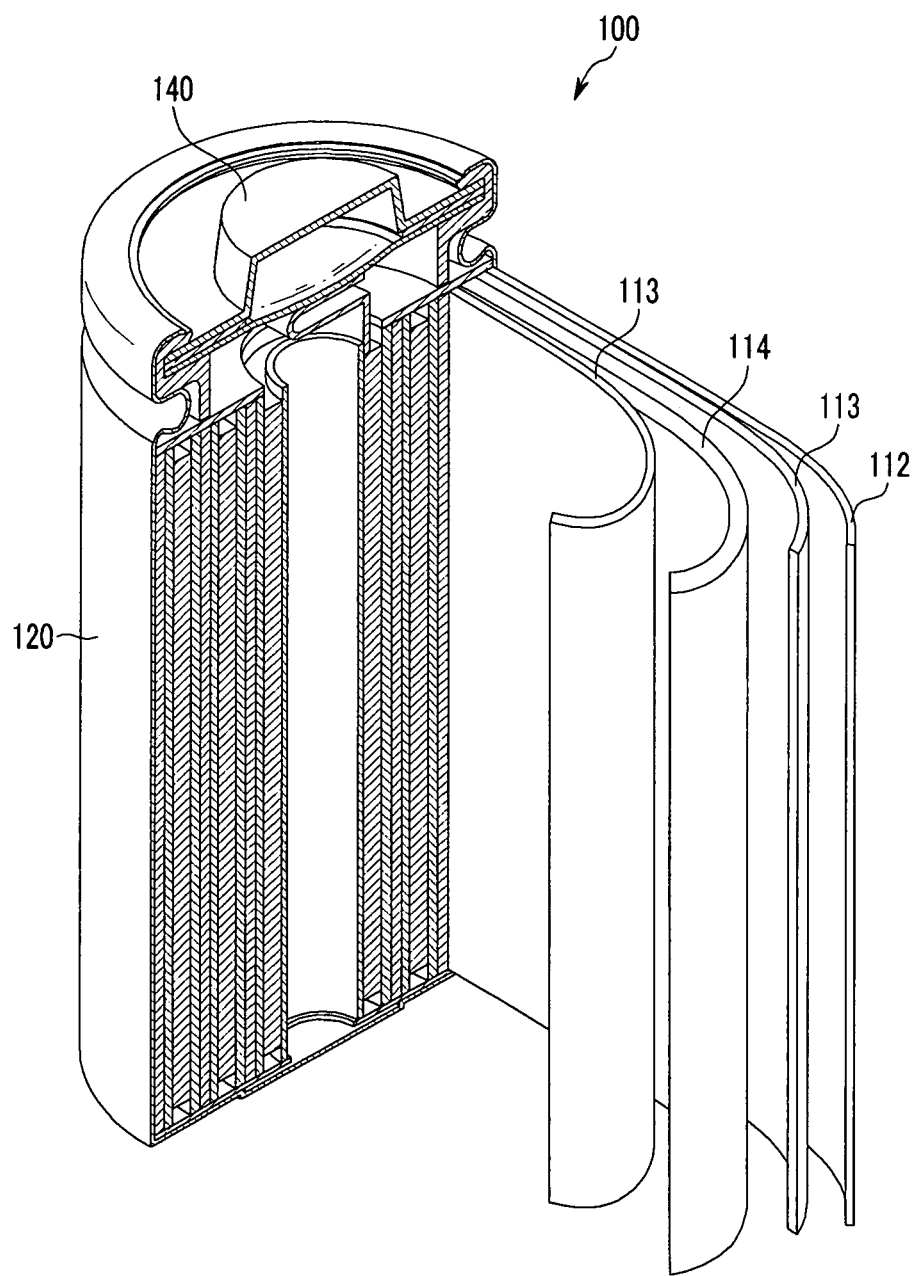

ELECTROLYTE FOR RECHARGEABLE LITHIUM BATTERY AND RECHARGEABLE LITHIUM BATTERY INCLUDING THE SAME

CROSS-REFERENCE TO RELATED APPLICATION

This application claims priority to and the benefit of Korean Patent Application No. 10-2009-0027645 filed in the Korean Intellectual Property Office on Mar. 31, 2009, the entire contents of which are incorporated herein by reference.

BACKGROUND OF THE INVENTION (a) Field of the Invention

This invention relates to an electrolyte for a rechargeable lithium battery and a rechargeable battery including the same.

(b) Description of the Related Art

Batteries transform chemical energy generated from an electrochemical oxidation-reduction reaction of chemical materials inside the battery into electrical energy. Batteries are divided into primary batteries, which should be discarded after the energy inside the batteries is all consumed, and rechargeable batteries, which can be recharged several times.

Among batteries, the rechargeable battery can charged/discharged several times through the reversible transformation of chemical energy and electrical energy.

Meanwhile, recent development in the high-end electronic industry makes electronic devices smaller and lighter and which leads to an increase in portable electronic devices. Since portable electronic devices demand batteries with high energy density, researchers are studying vigorously to develop rechargeable lithium batteries.

A rechargeable lithium battery is fabricated by injecting electrolyte into a battery cell, which includes a positive electrode including a positive active material capable of intercalating/deintercalating lithium ions and a negative electrode including a negative active material capable of intercalating/deintercalating lithium ions. The electrolyte significantly affects the performance of the rechargeable lithium battery.

SUMMARY OF THE INVENTION

One aspect of the present invention provides an electrolyte for a rechargeable lithium battery capable of improving thickness and cycle-life characteristics at high temperature.

Another aspect of the present invention provides a rechargeable lithium battery including the electrolyte.

According to one aspect of the present invention, an electrolyte for a rechargeable lithium battery is provided that includes a lithium salt, a phosphine compound having at least one trialkylsilyl group, and an organic solvent.

The phosphine compound may include tris(trialkylsilyl)phosphine represented by the following Chemical Formula 1.

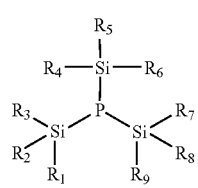

[Chemical Formula 1]

In Chemical Formula 1, $R_1$ to $R_9$ are the same or different, and are each independently selected from C1 to C6 alkyl.

The phosphine compound may include tris(trimethylsilyl)phosphine represented by the following Chemical Formula 2.

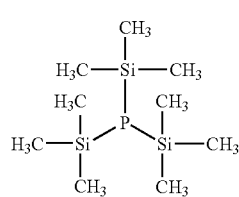

[Chemical Formula 2]

The electrolyte for a rechargeable lithium battery may further include a fluorine-containing carbonate compound, and the fluorine-containing carbonate compound may include fluoroethylene carbonate.

The fluorine-containing carbonate compound may be included in an amount of about 0.1 to about 11 wt % based on the total amount of the electrolyte.

The phosphine compound may be included in an amount of about 1 to about 11 wt % based on the total amount of the electrolyte.

According to another aspect of the present invention, a rechargeable lithium battery is provided that includes a positive electrode, a negative electrode, and an electrolyte including a lithium salt, a phosphine compound having at least one trialkylsilyl group and organic solvent.

Accordingly, the rechargeable lithium battery prevents the cycle-life from decreasing at room temperature as well as improving storage stability at high temperature and reducing an increase in the thickness of a battery.

BRIEF DESCRIPTION OF THE DRAWING

A more complete appreciation of the invention, and many of the attendant advantages thereof, will be readily apparent as the same becomes better understood by reference to the following detailed description when considered in conjunction with the accompanying drawings in which like reference symbols indicated the same or similar components, wherein:

FIG. 1 is a schematic view showing a rechargeable lithium battery according to one embodiment of the present invention.

DETAILED DESCRIPTION OF THE INVENTION

The present invention will be described more fully hereinafter, in which exemplary embodiments of the present invention are shown. This invention may, however, be embodied in many different forms and should not be construed as limited to the exemplary embodiments set forth herein.

The electrolyte for a rechargeable lithium battery according to one embodiment of the present invention includes a lithium salt, a phosphine compound having at least one trialkylsilyl group, and an organic solvent.

Lithium salts supply lithium ions in the battery, and perform a basic function of a rechargeable lithium battery. The lithium salts are not particularly limited as long as they release lithium ions in an electrolyte. Examples of the lithium salt include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$, where x and y are natural numbers, LiCl, LiI, or combinations thereof. In one embodiment, $LiPF_6$, $LiBF_4$, $LiAsF_6$, $LiClO_4$, $LiN(CF_3SO_2)_2$, $LiN(C_2F_5SO_2)_2$, $CF_3SO_3Li$, or combinations thereof may be used.

The lithium salt may be used at a concentration of about 0.1 to about 2.0M. When the lithium salt is included at the above concentration range, lithium ion mobility may be enhanced due to an appropriate electrolyte viscosity.

The phosphine compound has at least one trialkylsilyl group.

The phosphine compound may be tris(trialkylsilyl)phosphine represented by the following Chemical Formula 1:

[Chemical Formula 1]

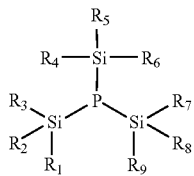

wherein $R_1$ to $R_9$ are the same or different and are each independently selected from C1 to C6 alkyl.

The tris(trialkylsilyl)phosphine compound represented by Chemical Formula 1 may include tris(trimethylsilyl)phosphine when $R_1$ to $R_9$ are methyl, respectively, as represented by the following Chemical Formula 2:

[Chemical Formula 2]

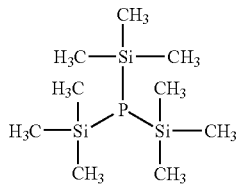

The phosphine compound may prevent the electrolyte characteristics from being deteriorated at high temperature. When the electrolyte includes the phosphine compound, it is possible to prevent the battery capacity from being decreased at high temperature, and preserves a capacity of over 80% when compared to the battery capacity at room temperature. Also, the electrolyte including the phosphine compound may reduce the generation of gas from the electrolyte and thereby prevents the battery from becoming thicker.

The phosphine compound may be included in an amount of about 1 to about 11 wt % based on the total amount of the electrolyte, more preferably from about 3 to about 10 wt %. Within these ranges, it is possible to prevent the cycle-life from being decreased at room temperature as well as improving the capacity retention at high temperature and reducing an increase in the thickness of the battery.

The organic solvent acts as a medium for transmitting lithium ions, and examples of the organic solvent include one selected from the group consisting of carbonate compounds, ester compounds, ether compounds, ketone compounds, and combinations thereof.

The carbonate compounds may include one selected from linear carbonate compounds, cyclic carbonate compounds, or combinations thereof.

The linear carbonate compounds may include, for example, dimethyl carbonate (DMC), ethylmethyl carbonate (EMC), diethyl carbonate (DEC), dipropyl carbonate (DPC), methylpropyl carbonate (MPC), and ethylpropyl carbonate (EPC), and the cyclic carbonate compound may include, for example, ethylene carbonate (EC), propylene carbonate (PC), and butylene carbonate (BC).

When the linear carbonate compounds and the cyclic carbonate compounds are mixed, an organic solvent having high dielectric constant and low viscosity may be provided. The cyclic carbonate compounds and linear carbonate compounds may be mixed together at a volume ratio of about 1:1 to about 1:9.

The organic solvent may be included as the remainder of the composition after the other components. For example, the organic solvent may be included in an amount ranging from about 1 to about 90 wt % based on the total amount of the electrolyte.

The electrolyte for a rechargeable lithium battery may further include a fluorine-containing carbonate compound. The Fluorine-containing carbonate compound acts as an additive for improving the performance of the electrolyte. For example, it may be fluoroethylene carbonate (FEC).

The fluorine-containing carbonate compound may be included in an amount of about 0.1 to about 11 wt % based on the total amount of the electrolyte, more preferably from about 3 to about 10 wt %. Within these ranges, it is possible to improve cycle-life at room temperature as well as improve the capacity retention at high temperature and reduce an increase in the thickness of the battery.

Hereafter, a rechargeable lithium battery according to another embodiment of the present invention will be described by referring to FIG. 1.

FIG. 1 is a schematic view showing a rechargeable lithium battery according to one embodiment of the present invention.

Referring to FIG. 1, the rechargeable lithium battery 100 includes a battery cell including a positive electrode 114, a negative electrode 112 facing the positive electrode 114, a separator 113 interposed between the positive electrode 114 and negative electrode 112, and an electrolyte (not shown) impregnating the positive electrode 114, negative electrode 112, and separator 113, a battery case 120, and a sealing member 140 for sealing the battery case 120.

The positive electrode 114 includes a current collector and a positive active material layer formed on the current collector.

The current collector may be an aluminum foil, but is not limited thereto.

The positive active material layer includes a positive active material, a binder, and a conductive material.

For the positive active material, compounds being capable of reversibly intercalating and deintercalating lithium ions may be used without limitation. Examples of the positive active material include composite oxide including lithium (Li) and a metal selected from the group consisting of cobalt (Co), manganese (Mn), nickel (Ni), and combinations thereof as follows:

$Li_aA_{1-b}H_bD_2$ wherein, in the above formula, $0.90 \leq a \leq 1.8$, and $0 \leq b \leq 0.5$; $Li_aE_{1-b}H_bO_{2-c}D_c$ wherein, in the above formula, $0.90 \leq a \leq 1.8$, $0 \leq b \leq 0.5$, and $0 \leq c \leq 0.05$; $LiE_{2-b}H_bO_{4-c}D_c$ wherein, in the above formula, $0 \leq b \leq 0.5$, and $0 \leq c \leq 0.05$; $Li_aNi_{1-b-c}Co_bH_cD_\alpha$ wherein, in the above formula, $0.90 \leq a \leq 1.8$, $0 \leq b \leq 0.5$, $0 \leq c \leq 0.05$, and $0 \leq \alpha \leq 2$; $Li_aNi_{1-b-c}Co_bH_cO_{2-\alpha}L_\alpha$ wherein, in the above formula, $0.90 \leq a \leq 1.8$, $0 \leq b \leq 0.5$, $0 \leq c \leq 0.05$, and $0 \leq \alpha \leq 2$; $Li_aNi_{1-b-c}Co_bH_cO_{2-\alpha}L_2$ wherein, in the above formula, $0.90 \leq a \leq 1.8$, $0 \leq b \leq 0.5$, $0 \leq c \leq 0.05$, and $0 \leq \alpha \leq 2$; $Li_aNi_{1-b-c}Mn_bH_cD_\alpha$ wherein, in the above formula, $0.90 \leq a \leq 1.8$, $0 \leq b \leq 0.5$, $0 \leq c \leq 0.05$, and $0 \leq \alpha \leq 2$; $Li_aNi_{1-b-c}Mn_bH_cO_{2-\alpha}L_\alpha$ wherein, in the above formula, $0.90 \leq a \leq 1.8$, $0 \leq b \leq 0.5$, $0 \leq c \leq 0.05$, and $0 < \alpha < 2$; $Li_aNi_{1-b-c}Mn_bH_cO_{2-\alpha}L_2$ wherein, in the above formula, $0.90 \leq a \leq 1.8$, $0 \leq b \leq 0.5$, $0 \leq c \leq 0.05$, and $0 < \alpha < 2$; $Li_a$ $Ni_bE_cG_dO_2$ wherein, in the above formula, $0.90 \leq a \leq 1.8$, $0 \leq b \leq 0.9$, $0 \leq c \leq 0.5$, and $0.001 \leq d \leq 0.1$; $Li_aNi_bCo_cMn_dG_eO_2$ wherein, in the above formula, $0.90 \leq a \leq 1.8$, $0 \leq b \leq 0.9$, $0 \leq c \leq 0.5$, $0 \leq d \leq 0.5$, and $0.001 \leq e \leq 0.1$; $Li_aNiG_bO_2$ wherein, in the above formula, $0.90 \leq a \leq 1.8$, and $0.001 \leq b \leq 0.1$; $Li_aCoG_bO_2$ wherein, in the above formula, $0.90 \leq a \leq 1.8$, and $0.001 \leq b \leq 0.1$; $Li_aMnG_bO_2$ wherein, in the above formula, $0.90 \leq a \leq 1.8$, and $0.001 \leq b \leq 0.1$; $Li_aMn_2G_bO_4$ wherein, in the above formula, $0.90 \leq a \leq 1.8$, and $0.001 \leq b \leq 0.1$; $QO_2$; $QS_2$; $LiQS_2$; $V_2O_5$; $LiV_2O_5$; $LiRO_2$; $LiNiVO_4$; $Li_{(3-f)}J_2(PO_4)_3$ $(0 \leq f \leq 2)$; $Li_{(3-f)}Fe_2(PO_4)_3$ $(0 \leq f \leq 2)$; and $LiFePO_4$.

In the above formulas, A is selected from the group consisting of Ni, Co, Mn, and combinations thereof, H is selected from the group consisting of Al, Ni, Co, Mn, Cr, Fe, Mg, Sr, V, a rare earth element, and combinations thereof, D is selected from the group consisting of O, F, S, P, and combinations thereof, E is selected from the group consisting of Co, Mn, and combinations thereof, L is selected from the group consisting of F, S, P, and combinations thereof, G is selected from the group consisting of Al, Cr, Mn, Fe, Mg, La, Ce, Sr, V, and combinations thereof, Q is selected from the group consisting of Ti, Mo, Mn, and combinations thereof, R selected from the group consisting of Cr, V, Fe, Sc, Y, and combinations thereof, and J selected from the group consisting of V, Cr, Mn, Co, Ni, Cu, and combinations thereof.

The binder may improve binding properties of the positive active material particles to one another, and also adhesive properties with a current collector. Any material may be used for the binder without limitation if it does not cause a chemical change and improves adherence. Examples of the binder include polyvinyl alcohol, carboxylmethyl cellulose, hydroxypropyl cellulose, diacetyl cellulose, polyvinyl chloride, carboxylated polyvinyl chloride, polyvinyl difluoride, an ethylene oxide-containing polymer, polyvinyl pyrrolidone, polyurethane, polytetrafluoroethylene, polyvinylidene fluoride, polyethylene, polypropylene, styrene-butadiene rubber, acrylated styrene-butadiene rubber, an epoxy resin, and nylon.

A conductive material may be included to improve electrode conductivity. Any electrically conductive material may be used as a conductive material unless it causes a chemical change. Examples of the conductive material include polyphenylene derivatives, natural graphite, artificial graphite, carbon black, acetylene black, ketjen black, carbon fiber, and metal powders and metal fiber including copper, nickel, aluminum silver, and the like.

The compound may have a coating layer on the surface. The coating layer may include a compound selected from the group consisting of oxide, hydroxide, oxyhydroxide, oxycarbonate, hydroxycarbonate, and combinations thereof including metal or semi-metal selected from Mg, Al, Co, K, Na, Ca, Si, Ti, V, Sn, Ge, Ga, B, As, Zr, or combinations thereof. The compound of a coating layer may be amorphous or crystalline.

The negative electrode 112 includes a current collector and a negative active material layer formed on the current collector.

The current collector may be selected from the group consisting of a copper foil, a nickel foil, a stainless steel foil, a titanium foil, a nickel foam, a polymer substrate coated with a conductive metal, and combinations thereof.

The negative active material layer includes a negative active material, a binder, and a conductive material.

For the negative active material, a material that reversibly intercalates/deintercalates lithium ions, lithium, lithium alloy, a material capable of alloying with lithium, materials capable of doping and dedoping lithium, transition metal oxide, or combinations thereof may be used. The material that reversibly intercalates/deintercalates lithium ions includes carbon-based negative active materials.

The carbon-based negative active materials may be selected from crystalline carbon, amorphous carbon, or combinations thereof. The crystalline carbon may be non-shaped, or sheet, flake, spherical, or fiber shaped natural graphite or artificial graphite. The amorphous carbon may be a soft carbon (carbon obtained through sintering at a low temperature), a hard carbon (carbon obtained through sintering at a high temperature), mesophase pitch carbide, fired coke, and so on.

The materials being capable of alloying with lithium include an element selected from the group consisting of Na, K, Rb, Cs, Fr, Be, Mg, Ca, Sr, Ba, Ra, Ti, Ag, Zn, Cd, Al, Ga, In, Si, Ge, Sn, Pb, Sb, Bi, and combinations thereof.

Examples of the transition metal oxide, compounds capable of doping and dedoping lithium, or compounds capable of reversibly reacting with lithium include those selected from the group consisting of vanadium oxide, lithium vanadium oxide, Si, $SiO_x$ ($0<x<2$), Sn, $SnO_2$, composite tin alloys, and combinations thereof.

The binder and conductive material are the same as described above.

The separator 113 may be a single layer or multilayer, for example made of polyethylene, polypropylene, polyvinylidene fluoride, or combinations thereof.

The electrolyte includes a lithium salt, a phosphine compound having at least one trialkylsilyl group, and an organic solvent that are as described above. Redundant description is omitted.

The following examples illustrate the present invention in more detail. These examples, however, should not in any sense be interpreted as limiting the scope of the present invention.

PREPARATION OF ELECTROLYTE

Example 1

An electrolyte for a rechargeable lithium battery was prepared by adding about 3 wt % of tris(trialkylsilyl)phosphine (TMSPin) to an organic solvent with 1.15M $LiPF_6$ dissolved therein. The organic solvent was prepared by mixing ethylene carbonate (EC); ethylmethyl carbonate (EMC); and diethyl carbonate (DEC) at a ratio of about 3:5:2.

Example 2

An electrolyte for a rechargeable lithium battery was prepared according to the same method as in Example 1, except that tris(trialkylsilyl)phosphine (TMSPin) was included in an amount of about 10 wt %.

Example 3

An electrolyte for a rechargeable lithium battery was prepared according to the same method as in Example 1, except that tris(trialkylsilyl)phosphine (TMSPin) was included in an amount of about 11 wt %.

Example 4

An electrolyte for a rechargeable lithium battery was prepared according to the same method as in Example 1, except that fluoroethylene carbonate (FEC) was further included in an amount of about 3 wt %.

Example 5

An electrolyte for a rechargeable lithium battery was prepared according to the same method as Example 4, except that tris(trialkylsilyl)phosphine (TMSPin) was included in an amount of about 5 wt %.

Example 6

An electrolyte for a rechargeable lithium battery was prepared according to the same method as Example 4, except that tris(trialkylsilyl)phosphine (TMSPin) was included in an amount of about 10 wt %.

Example 7

An electrolyte for a rechargeable lithium battery was prepared according to the same method as Example 4, except that fluoroethylene carbonate (FEC) was included in an amount of about 5 wt %.

Example 8

An electrolyte for a rechargeable lithium battery was prepared according to the same method as Example 4, except that fluoroethylene carbonate (FEC) was included in an amount of about 10 wt %.

Example 9

An electrolyte for a rechargeable lithium battery was prepared according to the same method as Example 4, except that fluoroethylene carbonate (FEC) was included in an amount of about 11 wt %.

Comparative Example 1

An electrolyte for a rechargeable lithium battery was prepared by adding 1.15M of $LiPF_6$ to an organic solvent prepared by mixing ethylene carbonate (EC): ethylmethyl carbonate (EMC): diethyl carbonate (DEC) at a ratio of about 3:5:2.

Comparative Example 2

An electrolyte for a rechargeable lithium battery was prepared according to the same method as in Comparative Example 1, except that fluoroethylene carbonate (FEC) was further included in an amount of about 3 wt %.

The electrolytes of Examples 1 to 9 and Comparative Examples 1 and 2 are shown in Table 1.

TABLE 1

| | Lithium salt (M) | Organic solvent (volume %) | | | Additive (wt %) | |
| --- | --- | --- | --- | --- | --- | --- |
| | $LiPF_6$ | EC | EMC | DEC | TMSPin | FEC |
| Example 1 | 1.15 | 3 | 5 | 2 | 3 | — |
| Example 2 | 1.15 | 3 | 5 | 2 | 10 | — |
| Example 3 | 1.15 | 3 | 5 | 2 | 11 | — |
| Example 4 | 1.15 | 3 | 5 | 2 | 3 | 3 |
| Example 5 | 1.15 | 3 | 5 | 2 | 5 | 3 |
| Example 6 | 1.15 | 3 | 5 | 2 | 10 | 3 |
| Example 7 | 1.15 | 3 | 5 | 2 | 3 | 5 |
| Example 8 | 1.15 | 3 | 5 | 2 | 3 | 10 |
| Example 9 | 1.15 | 3 | 5 | 2 | 3 | 11 |
| Comp. Ex. 1 | 1.15 | 3 | 5 | 2 | — | — |
| Comp. Ex. 2 | 1.15 | 3 | 5 | 2 | — | 3 |

<Fabrication of Rechargeable Lithium Battery Cells>

Battery cells were fabricated by using $LiCoO_2$ and $Ni_{0.5}Co_{0.2}Mn_{0.3}$ as a positive active material, using artificial graphite as a negative active material, and using a polyethylene film as a separator. Subsequently, the electrolytes prepared according to Examples 1 to 9 and Comparative Examples 1 and 2 were injected into the battery cells respectively to thereby fabricate rechargeable lithium battery cells of 800 mAh capacity.

<Performance Test>

The rechargeable lithium battery cells fabricated in the above-described methods were allowed to stand still at 85° C. for 5 hours and the capacity retention and thickness increase ratios of the battery cells were measured. Also, the cycle-lives of the rechargeable lithium battery cells fabricated in the above-described methods were measured after the rechargeable lithium battery cells were operated for 100 cycles at room temperature.

The results are shown in Table 2.

TABLE 2

| | Thickness increase ratio (%) | Capacity retention (%) | Cycle-life at room temp. (%) |
| --- | --- | --- | --- |
| Example 1 | 21 | 85 | 79 |
| Example 2 | 13 | 88 | 75 |
| Example 3 | 13 | 89 | 73 |
| Example 4 | 8 | 91 | 90 |
| Example 5 | 6 | 91 | 91 |
| Example 6 | 4 | 93 | 93 |
| Example 7 | 6 | 94 | 93 |
| Example 8 | 9 | 92 | 94 |
| Example 9 | 15 | 91 | 94 |
| Comp. Ex. 1 | 30 | 70 | 83 |
| Comp. Ex. 2 | 28 | 76 | 91 |

Table 2 shows that the rechargeable lithium battery cells including the electrolytes of Examples 1 to 9 had improved capacity retention without any remarkable increase in the thickness after they were allowed to stand still at high temperature, compared to the rechargeable lithium battery cells including the electrolytes of Comparative Examples 1 and 2. These results indicate that the performance of the rechargeable lithium battery cells were improved at high temperature when tris(trialkylsilyl)phosphine (TMSPin) is included in their electrolytes.

Also, when including fluoroethylene carbonate (FEC) in addition to tris(trialkylsilyl)phosphine (TMSPin), as in Examples 4 to 9, the rechargeable battery cells had an even greater improved performance.

Also, when including fluoroethylene carbonate (FEC) in addition to tris(trialkylsilyl)phosphine (TMSPin), as in Examples 4 to 9, the rechargeable battery cells had longer cycle-life at room temperature.

Also, when tris(trialkylsilyl)phosphine (TMSPin) and fluoroethylene carbonate (FEC) were included in an amount of less than about 10 wt % individually, as in Examples 4 to 8, the rechargeable battery cells had lower thickness increase ratios after being allowed to stand still at high temperature, excellent capacity retention, and longer cycle-life at room temperature.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electrolyte for a rechargeable lithium battery, comprising:
a lithium salt,
a phosphine compound having at least one trialkylsilyl group, and
an organic solvent, wherein
the phosphine compound comprises is tri(trialkylsilyl) phosphine represented by the following Chemical Formula 1:

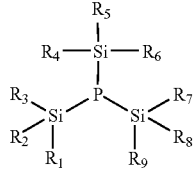

[Chemical Formula 1]

in Chemical Formula 1, $R_1$ to $R_9$ are the same or different, and are each independently selected from $C_1$ to $C_6$ alkyl.

2. The electrolyte of claim 1, wherein the phosphine compound comprises tri(trimethylsilyl)phosphine represented by the following Chemical Formula 2:

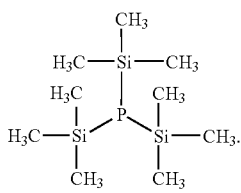

[Chemical Formula 2]

3. The electrolyte of claim 1, wherein the electrolyte further comprises a fluorine-containing carbonate compound.

4. The electrolyte of claim 3, wherein the fluorine-containing carbonate compound comprises fluoroethylene carbonate.

5. The electrolyte of claim 3, wherein the fluorine-containing carbonate compound is included in an amount of about 0.1 to about 11 wt % based on the total amount of the electrolyte.

6. The electrolyte of claim 3, wherein the fluorine-containing carbonate compound is included in an amount of about 3 wt % to about 10 wt % based on the total amount of the electrolyte.

7. The electrolyte of claim 1, wherein the phosphine compound is included in an amount of about 1 to about 11 wt % based on the total amount of the electrolyte.

8. The electrolyte of claim 1, wherein the phosphine compound is included in an amount of about 3 to about 10 wt % based on the total amount of the electrolyte.

9. The electrolyte of claim 1, wherein the organic solvent comprises ethylene carbonate (EC); ethylmethyl carbonate (EMC); and diethyl carbonate (DEC).

10. A rechargeable lithium battery comprising
a positive electrode,
a negative electrode, and
an electrolyte including a lithium salt, a phosphine compound having at least one trialkylsilyl group and organic solvent, wherein
the phosphine compound comprises tris(trialkylsilyl)phosphine represented by the following Chemical Formula 1;

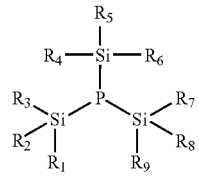

[Chemical Formula 1]

in Chemical Formula 1, $R_1$ to $R_9$ are the same or different, and are each independently selected from $C_1$ to $C_6$ alkyl.

11. The rechargeable lithium battery of claim 10, wherein the phosphine compound comprises tris(trimethylsilyl)phosphine represented by the following Chemical Formula 2:

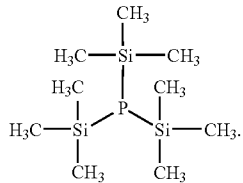

[Chemical Formula 2]

12. The rechargeable lithium battery of claim 10, wherein the electrolyte further comprises a fluorine-containing carbonate compound.

13. The rechargeable lithium battery of claim 12, the fluorine-containing carbonate compound comprising fluoroethylene carbonate.

14. The rechargeable lithium battery of claim 12, wherein the fluorine-containing carbonate compound is included in an amount of about 0.1 to about 10 wt % based on the total amount of the electrolyte.

15. The rechargeable lithium battery of claim 12, wherein the fluorine-containing carbonate compound is included in an amount of about 3 wt % to about 10 wt % based on the total amount of the electrolyte.

16. The rechargeable lithium battery of claim 10, wherein the phosphine compound is included in an amount of about 1 to about 11 wt % based on the total amount of the electrolyte.

17. The rechargeable lithium battery of claim 10, wherein the phosphine compound is included in an amount of about 3 to about 10 wt % based on the total amount of the electrolyte.

18. The rechargeable lithium battery of claim 10, wherein the organic solvent comprises ethylene carbonate (EC); ethylmethyl carbonate (EMC); and diethyl carbonate (DEC).

* * * * *